United States Patent [19]

Chung et al.

[11] Patent Number: 5,116,914
[45] Date of Patent: May 26, 1992

[54] CATHODIC ELECTRODEPOSITION COATINGS CONTAINING ALKYL METAL ACETONATE CATALYST

[75] Inventors: Ding Y. Chung, Rochester Hills; Tapan K. Debroy, Shelby Township, Macomb County, both of Mich.

[73] Assignee: E. I. Du Pont de Nemours and Company, Wilmington, Del.

[21] Appl. No.: 629,475

[22] Filed: Dec. 18, 1990

[51] Int. Cl.$^5$ .................... C08L 63/02; C08F 283/10
[52] U.S. Cl. .................... 525/528; 523/415; 528/45
[58] Field of Search .................... 523/415; 525/528; 528/45

[56] References Cited

U.S. PATENT DOCUMENTS

| | | | |
|---|---|---|---|
| 3,839,252 | 10/1974 | Bosso et al. | 260/29.2 |
| 3,937,679 | 2/1976 | Bosso et al. | 260/29.4 |
| 4,066,525 | 1/1978 | Woo et al. | 204/181 |
| 4,246,151 | 1/1981 | Dohy et al. | 523/415 |
| 4,352,842 | 10/1982 | Kooymans et al. | 427/385 |
| 4,385,097 | 5/1983 | Isozaki et al. | 428/458 |
| 4,397,990 | 8/1983 | Kooymans et al. | 525/167 |
| 4,401,774 | 8/1983 | Kooymans et al. | 523/402 |
| 4,405,763 | 9/1983 | Kooymans et al. | 525/438 |
| 4,495,327 | 1/1985 | Schenck et al. | 524/556 |
| 4,524,161 | 6/1985 | Feuerhahn | 523/414 |
| 4,537,805 | 8/1985 | Lin | 427/54.1 |
| 4,617,331 | 10/1986 | Boberski et al. | 523/420 |
| 4,647,604 | 3/1987 | Kempter et al. | 523/402 |
| 4,980,398 | 12/1990 | Chung et al. | 523/415 |
| 5,066,688 | 11/1991 | Chung et al. | 523/415 |

FOREIGN PATENT DOCUMENTS 3525110  1/1987  Fed. Rep. of Germany ........ 528/45

Primary Examiner—Melvyn I. Marquis
Assistant Examiner—Christopher P. Rogers
Attorney, Agent, or Firm—Hilmar L. Fricke

[57] ABSTRACT

An improved aqueous electrocoating composition that contains a catalyst for a curing the components of the electocoating composition of a blocked polyisocyanate and an epoxy amine adduct, wherein the catalyst is alkyl tin diacetyl acetonate, preferably, dibutol tin diacetyl acetonate.

3 Claims, No Drawings

CATHODIC ELECTRODEPOSITION COATINGS CONTAINING ALKYL METAL ACETONATE CATALYST

BACKGROUND OF THE INVENTION

This invention is directed to a cathodic electrocoating composition and in particular to a cathodic electrocoating composition containing primary metal catalyst for crosslinking of the compsition on curing.

The coating of electrically conductive substrates by an electrodeposition process (also called an electrocoating process) is a well known and important industrial process. Electrodeposition of primers to automotive substrastes is widely used in the automotive industry. In this process, a conductive article, such as an autobody or an auto part, is immersed in a bath of a coating compostion of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating deposited on the article is a function of the bath characteristics, the electrical operating characteristics, the immersion time, and the like.

The coated article is removed from the bath after a certain period of time. The article is rinsed with deionized water and the coating is cured typically in an oven at sufficient temperature to produce a crosslinked coating.

Cathodic electrocoating compositions and resin compositions, coating baths, and cathodic electrodeposition processes are disclosed in U.S. Pat. Nos. 3,922,253; 4,419,467; 4,137,140; and 4,468,307.

Cathodic electrocoating compositions contain catalysts which increase the curing rate and reduce curing temperatures of the composition after it has been applied. Examples of known catalysts that are used in electrocoating composition are dibutyl tin oxide and dibutyl tin dilaurate. Thses catalysts are used in amounts of about 0.25-2% by weight, based on the total weight resin, in the composition. However, dibutyl tin oxide is a solid which is difficult to disperse and keep dispersed in an electrocoating bath. Dibutyl tin dilaurate can be hydrolyzed in an electrocoating bath and form lauric acid which causes film appearance problems such as cratering. A catalyst is needed that is readily dispersed and remains dispersed in the electrocoating bath.

SUMMARY OF THE INVENTION

An improved aqueous electrocoating composition that contains a catalyst for a curing the components of the electocoating composition of a blocked polyisocyanate and an epoxy amine adduct wherein the catalyst is alkyl tin diacetyl acetonate.

DETAILED DESCRIPTION TO THE INVENTION

The alkyl tin diacetyl acetonate catalyst of this invention is easily dispersed in an aqueous electrocoating bath and remains dispersed in the bath and is hydrolytically stable for extended periods of time under conventional bath operating conditions. The catalyst is effective for transurethanization of the active hydrogen groups of the epoxy amine adduct and the blocked isocyanate groups that are film forming components in a typical electrocoating composition. The catalyst also can be used for transesterification and transamidation of other suitable compositions.

One preferred catalyst is dibutyl tin diacetonate which can be prepared by the condensation reaction of dibutyl tin oxide and 2,4 pentanedione at 100°-200° C. for about 4–8 hours. Water formed during the reaction is removed by azeotropic distillation. Preferably, toluene is used in the reaction to form the catalyst.

The catalyst is used in the elecrocoating composition at a level of least 0.25% by weight, based on the total weight of resin solids in the elecrocoating composition and preferably, the catalyst is used at a level of about 0.25–2.0% by weight.

Most principal emulsions used in an electrocoating composition comprise an aqueous emulsion of an epoxy amine adduct blended with a cross-linking agent which has been neutralized with an acid to form a water soluble product. Generally, the alkyl tin diacetyl acetonate catalyst is added to a blend of the epoxy amine adduct and crosslinking agent before water is added to form an emulsion. The catalyst is added in solution and mixed with the blend of epoxy amine adduct and crosslinking agent.

The alkyl tin diacetyl acetonate catalyst is potentially usable with a variety of different cathodic electrocoat binder resins, but the preferred binder resin is the typical epoxy-amine adduct of the prior art. These resins are generally disclosed in U.S. Pat. No. 4,419,467 which is incorporated herein by reference.

Preferred crosslinkers for the above binder resins are also well known in the prior art. These are aliphatic and aromatic isocyanates such as hexamethylene diisocyanate, toluene diisocyanate, methylene diphenyl diisocyanate and the like. These isocyanates are pre-reacted with a blocking agent such as oximes, alcohols, and caprolactams which block the isocyanate functionality i.e. the crosslinking functionality. Upon heating the blocking agents separate and crosslinking occurs. Isocyanate crosslinkers and various blocking agents are well known in the prior art. These crosslinking agents and blocking agents are also disclosed in U.S. Pat. No. 4,419,467.

The cathodic binder resin of the epoxy amine adduct and the blocked isocyanate are the principal resinous ingredients in the electrocoating composition and are usually present in amounts of about 30 to 50 percent by weight of solids.

Besides the binder resin described above, the electrocoating composition usually contains pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, the particle size is about 6-8 using a Hegman grinding gauge.

Pigments which can be used in this invention include titanium dioxide, basic lead silicate, strontium chromate, carbon black, iron oxide, clay and the like. Pigments with high surface areas and oil absorbencies should be used judiciously because these can have an undesirable effect on coalescence and flow of the electrodeposited coating.

The pigment-to-resin weight ratio is also important and should be preferably less than 0.5:1, more preferably less than 0.4:1, and usually about 0.2 to 0.4:1. Higher pigment-to-resin solids weight ratios have also been found to adversely affect coalescence and flow.

The coating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104".These optional ingredients, when present, constitute from about 0.1 to 20 percent by weight of resin solids.

Optionally, plasticizers can be used to promote flow. Examples of useful plasticizers are high boiling water immiscible materials such as ethylene or propylene oxide adducts of nonyl phenols or bisphenol A. Plasticers are usually used at levels of about 0.1 to 15 percent by weight resin solids.

The electrocoating coating composition of this invention is an aqueous dispersion. The term "dispersion" as used within the context of this invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferrably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0.1 to 15 percent by weight, preferably about 0.5 to 5 percent by weight based on total weight of the resin solids.

The following example illustrates the invention. All parts and percentages are on a weight basis unless otherwise indicated.

EXAMPLE

EXAMPLE A

Preparation of Dibutyl Tin Diacetyl Acetonate Catalyst

Dibutyl tin diacetyl acetonate is the condensation product of dibutyl tin oxide and 2,4 pentanedione.

498 parts of dibutyl tin oxide, 400 parts of 2,4 pentane dione and 250 parts of toluene were added to a reactor equipped with a heating source, stirrer, and a reflux. The resulting mixture was heated to its reflux temperature and held at this temperature until 36 parts of water were removed. The resulting product was a clear solution of dibutyl tin diacetyl acetonate in toluene.

Preparation of Chain Extended Polyepoxide

The following ingredients were charged into a reaction vessel equipped as above: 1394.8 parts Epon 828 ® (epoxy from Shell Chemical Company having an epoxy equivalent weight of 188); 527.2 parts Bisphenol A; 395.6 parts Tone 200 ® (polycaprolactone diol from Union Carbide, hydroxy equivalent weight of 263.6); and 101.2 parts xylene. The charge is heated to 145° C. under a nitrogen blanket. 2.4 parts dimethyl benzyl amine were added and the mixture held at 160° C. for one hour. An additional 5.2 parts dimethyl benzyl amine were added and the mixture held at 147° C. until a 1170 epoxy equivalent weight was obtained. The mixture was cooled to 98° C. and 153.2 parts diketimine (reaction product of diethylene triamine and methyl isobutyl ketone having at 72.7% non-volatile content) and 118.2 parts methylethanol amine were added. The mixture was held at 120° C. for one hour, then 698.5 parts methyl isobutyl ketone were added. The resulting resin solution had a non-volatile of 75%.

Preparation of the Crosslinking Resin Solution

A blocked polyisocyanate crosslinking resin solution was prepared by charging 522.0 parts of TDI (toluene diisocyanate -"Mondur" TD 80 from Mobay Chemical Company) into a reaction vessel equipped as above. 0.15 parts dibutyltin dilaurate and 385.2 parts anhydrous methyl isobutyl ketone were added under a nitrogen blanket. 390.0 parts 2-ethyl hexanol were added to the mixture while keeping the reaction mixture below 60° C. 133.8 parts trimethylolpropane were added. The mixture was held at 120° C. for one hour until essentially all free isocyanate was consumed. Then 63.0 parts butanol were added. The resulting mixture had a 70.0% non-volatile.

Preparation of Electocoating Compositions 1-3

| Preparation of Electocoating Compositions 1-3 | | | |
|---|---|---|---|
| | Compositions | | |
| | 1 | 2 | 3 |
| Chain Extended Polyepoxide Solution (prepared above) | 1213 | 1213 | 1213 |
| Crosslinking Resin Solution (prepared above) | 699 | 699 | 699 |
| Dibutyl Tin Diacetyl Acetonate Catalyst Solution (prepared above) | 66 | 33 | 17 |
| Surfactant* | 23 | 23 | 23 |
| Aqueous Lactic Acid Solution (88% acid) | 51 | 51 | 51 |
| Deionized water | 2018 | 2018 | 2018 |
| Total | 4070 | 4037 | 4021 |

Preparation of Electocoating Compositions 1-3

| | Compositions | | |
|---|---|---|---|
| | 1 | 2 | 3 |
| % Sn based on resin solids | 0.96 | 0.48 | 0.24 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

The chain extended polyepoxide solution is thoroughly mixed with the crosslining resin solution, the dibutyl tin diacetonate solution, surfactant and lactic acid solution. Then the deionized water was added under agitation. This mixture was allowed to mix until a majority of the organic ketone had evaporated. The emulsion nonvolatile was adjusted to 36% with the necessary amount of deionized water.

Each of the above prepared electrocoating compositions were each charge into a separate electrocoating tank and zinc phosphate treated, cold-rolled steel panels were cathodically electrocoated. In each case the electrocoating bath was held at 28° C. and the panel were coated at 210 volts for two minutes. Two panels were coated in each bath and one cured for 17 minutes at 182° C. and the other at 200° C. The film builds were 0.67 and 0.66 mils, respectively. The films exhibited exceptional smoothness at both bakes. Each of the panel were tested for solvent resistance. Resistance to methyl isobutyl ketone (MIBK) was determined by 50 rubs with MIBK soaked cloth and resistance to methyl ethyl ketone was determined by a 1 minute soak test of the solvent. The results of these test are shown below:

| Composition | Bake Temp. (°C.) | MIBK Resistance | MEK Resistance |
|---|---|---|---|
| #1 | 182 | passed | passed |
| #1 | 200 | passed | passed |
| #2 | 182 | passed | passed |
| #2 | 200 | passed | passed |
| #3 | 182 | passed | failed |
| #3 | 200 | passed | passed. |

Except for the composition # 3 at the lower bake temperature each of the panels had accepatable solvent resistance.

We claim:

1. In a cathodic electrocoat composition, the catalyst being used to catalyze a curing reaction of the film forming constituents of the composition of a blocked polyisocyanate and a polymer comprising an epoxy amine adduct after the composition has been applied to a substrate; wherein the improvement comprises a catalyst of alkyl tin acetyl acetonate.

2. The cathodic electrocoating composition of claim 1 wherein the catalyst is dibutyl tin diacetyl acetonate.

3. The cathodic electrocoating composition of claim 1 in which the catalyst is present in an amout of about 0.25-2% by weight, based on the weight of the film forming constituents of the composition.

* * * * *